US010457311B2

(12) United States Patent
Vermillion et al.

(10) Patent No.: US 10,457,311 B2
(45) Date of Patent: Oct. 29, 2019

(54) FRAME STRUCTURE OF A PERAMBULATOR

(71) Applicant: EMMALJUNGA BARNVAGNSFABRIK AB, Vittsjö (SE)

(72) Inventors: Brendon Vermillion, Markaryd (SE); Joakim Edvardsson, Hässleholm (SE); Martin Jonasson, Hässleholm (SE); Christian Persson, Vittsjö (SE)

(73) Assignee: EMMALJUNGA BARNVAGNSFABRIK AB, Vittsjö (SE)

( * ) Notice: Subject to any disclaimer, the term of this patent is extended or adjusted under 35 U.S.C. 154(b) by 0 days.

(21) Appl. No.: 15/548,643

(22) PCT Filed: Feb. 3, 2016

(86) PCT No.: PCT/EP2016/000171
§ 371 (c)(1),
(2) Date: Aug. 3, 2017

(87) PCT Pub. No.: WO2016/124329
PCT Pub. Date: Aug. 11, 2016

(65) Prior Publication Data
US 2018/0022373 A1    Jan. 25, 2018

(30) Foreign Application Priority Data
Feb. 4, 2015   (DE) .................. 10 2015 001 264

(51) Int. Cl.
*B62B 9/10* (2006.01)
*B62B 9/00* (2006.01)
(Continued)

(52) U.S. Cl.
CPC .............. *B62B 9/10* (2013.01); *A47D 13/025* (2013.01); *B60N 2/26* (2013.01); *B60N 2/68* (2013.01);
(Continued)

(58) Field of Classification Search
CPC ..... B62B 2501/04; B62B 9/10; A47D 13/025; B60N 2/26; B60N 2/68; F16B 7/182
(Continued)

(56) References Cited

U.S. PATENT DOCUMENTS 2,719,688 A * 10/1955 Seifert ............... A47F 7/06
248/188.5
4,354,689 A * 10/1982 Perego ............... B62B 9/20
280/47.371
(Continued)

FOREIGN PATENT DOCUMENTS

| DE | 297 11 673 | 10/1997 |
|----|------------|---------|
| DE | 20 2005 016085 | 3/2007 |
| GB | 2420531 | 5/2006 |

OTHER PUBLICATIONS

European Patent Office, International Search Report, dated Apr. 21, 2016.

*Primary Examiner* — Mark R Wendell
(74) *Attorney, Agent, or Firm* — Price Heneveld LLP

(57) ABSTRACT

A frame structure of a perambulator, a child seat, an infant carrier or the like, includes a profiled frame element which along a profile direction of the frame element has a substantially constant cross-section, wherein the profiled frame element includes an at least predominantly closed cross-section, and wherein the profiled fame element has an inwardly projecting first protrusion which is configured to be brought into engagement with a fastening arrangement.

17 Claims, 3 Drawing Sheets

(51) Int. Cl.
*F16B 7/18* (2006.01)
*A47D 13/02* (2006.01)
*B60N 2/26* (2006.01)
*B60N 2/68* (2006.01)
*B62B 9/26* (2006.01)

(52) U.S. Cl.
CPC ............... *B62B 9/00* (2013.01); *F16B 7/182* (2013.01); *B62B 9/26* (2013.01); *B62B 2501/00* (2013.01); *B62B 2501/04* (2013.01)

(58) Field of Classification Search
USPC .................................................... 297/452.2
See application file for complete search history.

(56) References Cited

U.S. PATENT DOCUMENTS

| | | | |
|---|---|---|---|
| 4,620,637 A | 11/1986 | Karashima | |
| 4,852,597 A * | 8/1989 | Mark | A61H 3/02 135/69 |
| 6,006,477 A * | 12/1999 | Ko | A45B 19/04 135/25.4 |
| 6,305,869 B1 * | 10/2001 | Chen | B62K 3/002 280/87.041 |
| 8,926,214 B2 * | 1/2015 | Lah | A45B 9/00 135/75 |
| 9,543,634 B1 * | 1/2017 | Bailey | H01Q 1/1235 |
| 2004/0129471 A1 | 7/2004 | Cheng | |
| 2005/0120522 A1 | 6/2005 | Church et al. | |
| 2006/0131841 A1 * | 6/2006 | Huang | B62B 7/08 280/647 |
| 2008/0012409 A1 * | 1/2008 | Chen | A47D 13/107 297/274 |
| 2012/0025481 A1 | 2/2012 | Wu | |
| 2012/0046117 A1 * | 2/2012 | Zhang | A47D 13/105 472/119 |
| 2012/0097721 A1 * | 4/2012 | Winterhalter | B60N 3/10 224/409 |

* cited by examiner

FRAME STRUCTURE OF A PERAMBULATOR

BACKGROUND OF THE INVENTION

The present invention relates to a frame structure of a perambulator, a child seat, an infant carrier or the like, which comprises a profiled frame element with a specific cross-section configuration.

Profiled frame elements of the kind mentioned here for perambulators or child seats are well known from the art. Normally these consist of tubes with circular cross-sections or flattened tube cross-sections. With these designs it is disadvantageous that add-on components can be only be attached using additional ancillary structures, such as pipe clamps or the like.

The invention is therefore based on the requirement to provide a frame structure for a perambulator, a child seat, an infant carrier or the like, which for a simple construction and the capability of producing the same simply and at low cost, facilitates easy and simple fastening of the most varied add-on components. In other respects the frame structure shall make it possible to improve ease of repair in that it shall be possible to easily dismantle the add-on components and, in particular, without destroying a profiled frame element.

SUMMARY OF THE INVENTION

According to the invention a frame structure for a perambulator, a (car) child seat, an infant carrier or the like is provided comprising a profiled frame element having a substantially constant cross-section, wherein the profiled frame element is formed by an at least predominantly closed cross-section, and wherein the profiled frame element has an inwardly projecting first protrusion, which is designed to be brought into engagement with a fastening means. Advantageously the frame structure is constructed so as to be part of a perambulator, a child seat, an infant carrier. In other words the frame structure is dimensioned such that it is suitable for the intended use in a perambulator or child seat. To this end the cross-section of the profiled frame element has an extension in width of 10 mm to 40 mm, preferably 15 mm to 30 mm, and an extension in height of 15 mm to 60 mmm, preferably 25 mm to 45 mm. The profiled frame element is conveniently configured in such a way that it forms an at least predominantly closed cross-section, thus essentially forming a hollow profile or hollow body. In other words, the profiled frame element when seen in cross-section, encloses a hollow space or an interior or a profile interior. The cross-section then lies vertically to the profile direction of the profiled frame element. The profile direction is defined such that this is the extension along which the cross-sectional shape of the profiled frame element remains substantially the same. Essentially constant or the same thus takes into account local deviations due to manufacturing tolerances or local protrusions or recesses, as described with reference to the preferred embodiments. The profiled frame element has a predominantly closed cross-section, so that this may be either completely closed or may comprise a slit, which however amounts to only a small part of the total cross-section of the profiled frame element. As such it is preferred if the extension or the width of the slit takes up at most 0.1 times, preferably at most 0.02 times the total circumference of the profiled frame element in cross-section. Conveniently the profiled frame element has an inwardly projecting first protrusion. The protrusion of the profiled frame element thus protrudes into the interior of the profiled frame element or into the hollow space of the profiled frame element when seen in cross-section. In one embodiment the protrusion may be substantially radially aligned to the adjacent outer surface of the frame element. Preferably however, the protrusion extends along a line, which lies between two points arranged mirror-symmetrically on the frame element. This is particularly advantageous if the profiled frame element itself is configured mirror-symmetrically, so that the line along which the protrusion extends forms a vertical to the symmetry line. The protrusion is designed to be brought into engagement with a fastening means. To this end the protrusion may have a geometric configuration which allows a fastening means to be fixed thereto. This may for example be configured as a hole or through-hole with or without thread. It is understood that alternatively the protrusion may be constructed such that a fastening means can be fixed thereto with a clamping mechanism.

Advantageously the profiled frame element has an inwardly projecting second protrusion, which is arranged preferably opposite the first protrusion. When viewed in cross-section the first protrusion and the second protrusion lie on a line, which particularly conveniently for a mirror-symmetrical configuration of the profiled frame element forms a vertical to the symmetry axis. In other respects the second protrusion is especially conveniently configured identically to the first protrusion as regards shape, size and/or disposition. It is understood however, that the first and second protrusions may also be different from each other with respect to one or more of the above mentioned parameters. As such the first protrusion may project less than the second protrusion from the inner wall of the frame element. This is preferred in particular then, when the fastening means is formed as a bolt, which protrudes through a preferably threadless through-hole formed in the first protrusion and which is screwed into a blind hole provided in the second protrusion via a thread formed in there.

Conveniently the first and/or second protrusions extend over the entire profile direction. In other words, the first and/or second protrusions may thus form a kind of rail, which is arranged inside the profiled frame element and extends along the profile direction. Alternatively the first and/or second protrusion may however be configured such that when viewed in profile direction, it extends over only a part of the extension of the profiled frame element in profile direction. It is especially preferred if the protrusion is provided in those areas in which a fastening means is to be provided.

Preferably the profiled frame element comprises a first groove extending in profile direction, which is provided on the outside of the profiled frame element. The width of the groove is advantageously smaller than the width of the protrusion. It is preferred that the groove is arranged in that area of the profiled frame element, which has the protrusion arranged on its inside. The groove is configured such that it can receive a protrusion provided in a shell element in order to thus fix the shell element in its position relative to the profiled frame element.

Furthermore the profiled frame element advantageously comprises a second groove extending in profile direction, which is provided on the outside of the profiled frame element and which is preferably arranged opposite the first groove. The second groove basically comprises the same features as the first groove as regards shape, size and/or disposition. The second groove, however, is preferably arranged on a wall or surface of the profiled frame element, which lies opposite the wall or surface on which the first groove is arranged. For a substantially mirror-symmetrically configured profiled frame element the first and second grooves may also be arranged mirror-symmetrically to each other.

Advantageously the groove projects at least partially into the protrusion. In other words the first and/or second grooves are thus configured and positioned such that these extend deeply from the outer surface of the profiled frame element into or through the wall to the extent that they project into the protrusion. The groove is thus advantageously deeper than the thickness of the wall or the side of the profiled frame element.

Preferably the groove extends over part of the profile direction. Whilst the first and/or second protrusions advantageously extend over the entire profile direction, the first and/or second grooves are configured such that these extend over only part of the profile direction and thus do not form part of the basic configuration of the profile cross-section. Especially preferably the first and/or second grooves only extend over that area of the profiled frame element, which shall be covered or is covered by the shell element arranged thereon. Preferably the groove, in its extension along the profile direction, is thus smaller than the extension of the shell element along the profile direction.

Conveniently the groove thus extends only over or along a part of the protrusion extending in profile direction.

Advantageously the profiled frame element comprises at least one through-hole, which preferably extends through the first protrusion. The profiled frame element thus comprises at least one hole advantageously extending transversely to the profile direction from the outside of the profiled frame element as far as the hollow space enclosed by the same, and which is thus configured as a through-hole. Conveniently the through-hole is not provided with a thread. Especially advantageously the through-hole is arranged in such a way that it extends through the first protrusion. Insofar the depth of the through-hole is greater than the average wall thickness of the profiled frame element. As such it is advantageously possible to transfer larger forces from a fastening means extending through the through-hole onto the profiled frame element. It is especially preferred if the profiled frame element has two through-holes on one side, which thus preferably intersect the first protrusion. Preferably the plurality of through-holes is arranged in profile direction, i.e. along a straight which extends parallel to the profile direction.

Conveniently the axis of the through-hole intersects the second protrusion, wherein preferably a blind hole or through-hole is provided in the second protrusion. In other words the through-hole of the first protrusion and the blind hole or through-hole of the second protrusion may thus be coaxially aligned with each other or lie along the same axis or straight. The blind hole provided in the second protrusion is designed such that it opens into the inner space of the profiled frame element, i.e. the bottom of the blind hole ends in the wall or the outer surface of the profiled frame element or is formed by the same. Such a blind hole can for example be produced in that the drill producing the through-hole in the opposite wall is advanced as far as the inwardly directed second protrusion and drills into this. Conveniently the through-hole or blind hole provided in the second protrusion are provided with an inner thread, in which the fastening means engages or can engage.

In one preferred embodiment the frame structure further comprises a shell element, which substantially surrounds the profiled frame element, wherein the shell element can be fixed or is fixed to the profiled frame element by means of a fastening means or fastening element, preferably in that the fastening means is in engagement with the first protrusion. The shell element is therefore configured as a kind of sleeve, which can be pushed over the profiled frame element. To this end the shell element conveniently comprises an inner configuration, which in essence corresponds to the outer configuration of the profiled frame element. In order to fix or arrest or attach the shell element to the profiled frame element in profile direction, a fastening means or fastening element may be provided, which on the one hand, is in engagement with the first protrusion of the profiled frame element and, on the other hand, is in connection with the shell element. Since the shell element is conveniently guided on the profiled frame element and thus can be moved only along the profile direction, it may be sufficient for the fastening means to only extend into a through-hole formed in the first protrusion, without being screwed to the same. It is, however, especially convenient if the fastening means is for example configured as a screw bolt, which extends through the through-hole formed in the first protrusion and is screwed or can be screwed into the thread formed in the second protrusion.

Preferably the shell element comprises an inwardly projecting protrusion, which preferably is in, or can be brought into, form-locked engagement with the groove provided in the profiled frame element. In other words the shell element may have a protrusion which, in particular, is conveniently formed complementary to the recess or groove provided in the profiled frame element. Since the protrusion, when positioning the shell element on the profiled frame element, locks into the groove, moving the shell element on the profiled frame element then becomes very difficult so that pre-fixing or pre-positioning is advantageously possible. Especially advantageously the shell element comprises protrusions on two opposing inner surfaces, which protrusions can engage in the corresponding grooves of the profiled frame element.

Furthermore the shell element advantageously has a through-hole for the fastening means or element only on the side adjacent to the first protrusion. In other words the shell element has through-holes for fastening means or elements only on one side surface. On the opposite side, i.e. the side of the shell element which is to be disposed adjacent to the second protrusion, the shell element preferably does not have a breakthrough, at least in particular not a breakthrough for the fastening means. This is preferably that side, which when in use is arranged on the outside, whereas the side, on which the fastening elements are to be disposed, are as a rule, covered by a seat of the perambulator.

Further, according to the invention, provision is made for a shell element of a frame structure of a perambulator, a child seat, an infant carrier or the like, which is formed in the manner of a sleeve, comprises a first inwardly projecting protrusion and has one or more through-holes for fastening means only on one side surface, which through-holes preferably extend through the protrusion.

Advantageously the shell element further comprises a second inwardly projecting protrusion, wherein the two protrusions are provided on opposite inner surfaces of the shell element.

Further, in preferred embodiments, the shell element may comprise the features described with reference to the frame structure and concerning its shell element.

It is understood that in one preferred embodiment a plurality of through-holes provided on the side of the first protrusion and/or a plurality of blind holes or through-holes arranged on the side of the second protrusion may be provided in the profiled frame element. Correspondingly the shell element may also comprise a plurality of through-holes for fastening means or fastening elements.

Further, the profiled frame element is conveniently configured mirror-symmetrically. The symmetry axis is arranged, in particular, such that first and second protrusions of the profiled frame element are arranged mirror-symmetrically to one another.

Preferably the profiled frame element is extruded from a metal, preferably aluminium. In other words, the profiled frame element is conveniently configured as a one-piece body. The shell element may be produced from a plastic such as polyamide or polypropylene. The fastening means are conveniently shaped as bolts or screws, preferably made of steel. In particular the fastening means may be provided with self-tapping properties so that all that is necessary during manufacture is to provide the holes in the profiled frame element without having to additionally cut a thread.

The profiled frame element preferably has a wall thickness of 0.2 mm to 5 mm, preferably 0.6 mm to 3.5 mm and especially preferably 1 mm to 2 mm. This results in an ideal compromise between strength and weight.

The first and/or second protrusion projects inwardly in such a way that it projects from the inner surface of the profiled frame element by 0.6 mm to 15 mm, preferably 1.5 mm to 10 mm and especially preferably 2.5 mm to 5 mm. This makes it possible for the protrusions to optimally absorb forces without having a marked negative effect on the weight of the profiled frame element.

BRIEF DESCRIPTION OF THE DRAWINGS

Further advantages and features of the present invention will now be described with reference to the described embodiments, wherein features of individual embodiments can be combined with each other to form new embodiments. In the drawings.

DETAILED DESCRIPTION OF THE PREFERRED EMBODIMENTS

FIGS. 1 to 4 show a preferred embodiment of a frame structure according to the invention or a profiled frame element according to the invention.

Figure 1:
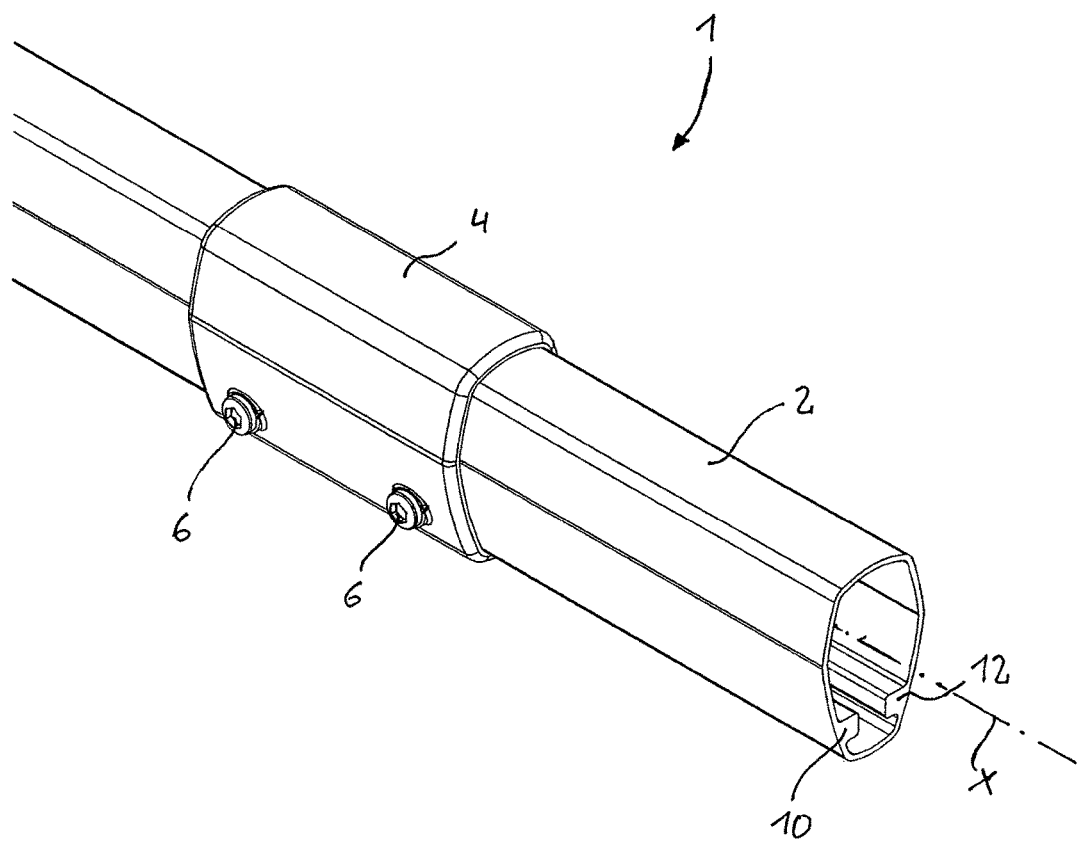
FIG. 1 is a perspective view of a first preferred embodiment of the frame structure according to the invention.

As revealed, in particular in FIG. 1, the frame structure 1 has a profiled frame element 2, to which a shell element 4 is attached by means of fastening means or arrangement 6.

The profiled frame element 2 extends along profile direction X and is designed so as to result in a profile body, the cross-section of which does essentially not change in profile direction X, but remains constant or the same.

The profiled frame element 2 is configured as a closed cross-section, thereby limiting an interior or inner space or hollow space 8. A first protrusion 10 and a second protrusion 12 are formed on the inside or inner surface or wall of the profiled frame element 2. The protrusions 10, 12 extend in profile direction advantageously over the entire profile length. Advantageously the profiled frame element 2 is configured mirror-symmetrically to a symmetry plane Y, wherein conveniently the projections 10, 12 are arranged mirror-symmetrically to one another.

Figure 2:
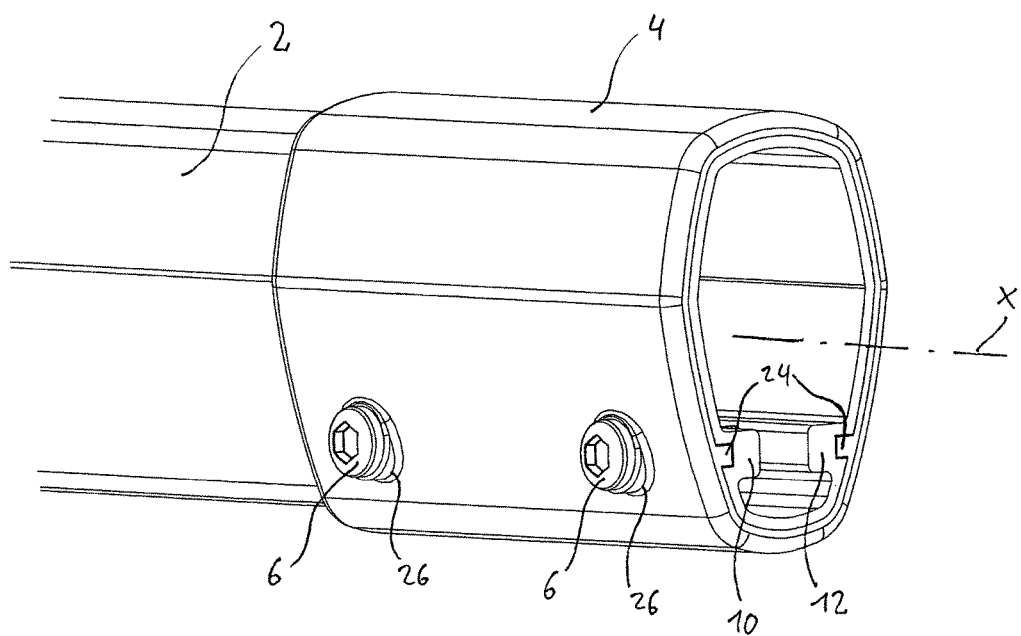
FIG. 2 is a partially cut view of the embodiment as per FIG. 1.
Figure 3:
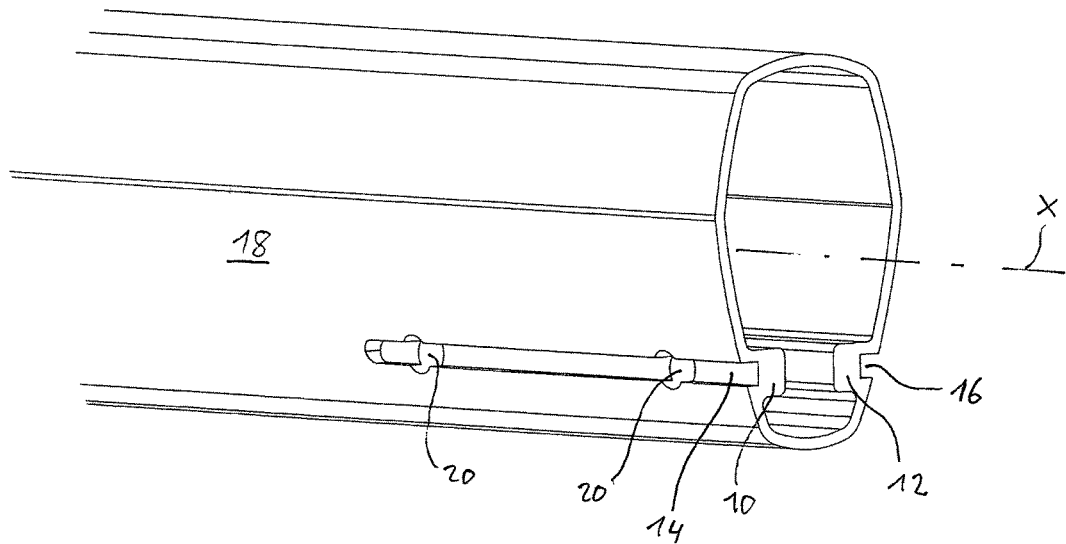
FIG. 3 is a partially cut perspective view of an embodiment of a profiled frame element.

Corresponding to the protrusions 10, 12 the profiled frame element 2, on its outer wall or outer surface, comprises a first groove 14 and a second groove 16 respectively, as shown in particular in FIGS. 2 and 3. Advantageously the first groove 14 and the second groove 16 are also arranged mirror-symmetrically to each other relative to the symmetry plane Y (see FIG. 4).

On a first side 18 or side surface, the profiled frame element has two through-bores or through-holes 20, which extend from the outside into the hollow space 8. The through-holes 20 are aligned with or lie on the first groove 14. In an alternative or additionally preferred embodiment the through-holes 20 are aligned or lie such that they protrude through the first protrusion.

Coaxially to the through-holes 20 blind holes 22 are formed in the second protrusion 12 (shown as a broken line in FIG. 4), which extend from the inside or hollow space 8 into the second protrusion 12, without penetrating the wall of the profiled frame element 2 through to the outside.

Figure 4:
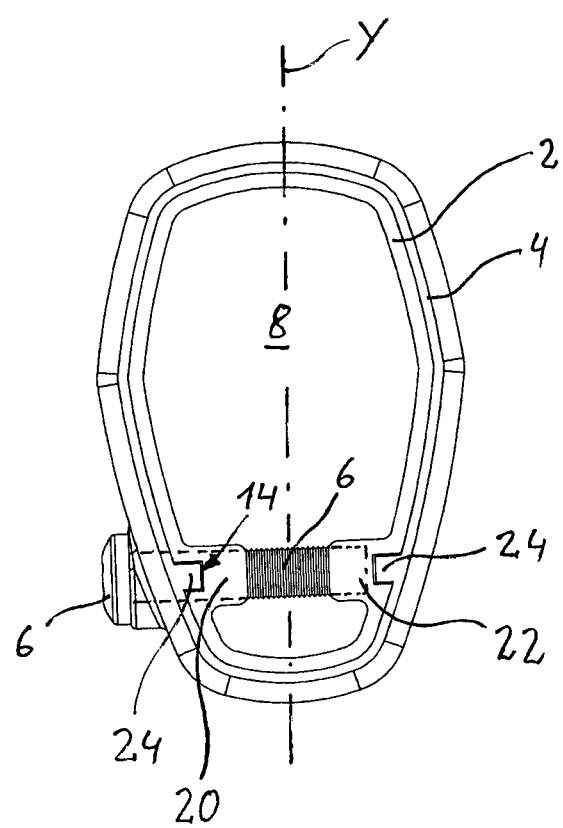
FIG. 4 is a partially cut cross-sectional view of the embodiment as per FIG. 1.

The shell element 4 comprises a cross-sectional configuration which is designed such that its inside essentially corresponds to the outside of the profiled frame element 2 or is congruent with it (see FIG. 4). The shell element 4, on its inwardly facing side towards the first groove 14 and the second groove 16 of the profiled frame element 2, comprises congruent protrusions 24. Following positioning of the shell element 4 on the profiled frame element 2 these protrusions lock into the first or the second groove 14, 16, thus enabling the shell element 4 to be pre-fixed on the profiled frame element 2. In order to fully fix the shell element 4 to the profiled frame element 2, the shell element 4 comprises through-holes 26, through which the fastening means 6 engage. This enables the shell element 4 to be attached to the profiled frame element 2.

LIST OF REFERENCE SYMBOLS 1 frame structure
2 profiled frame element
4 shell element
6 fastening means
8 hollow space
10 first protrusion
12 second protrusion
14 first groove
16 second groove
18 first side
20 through-hole
22 blind hole
24 protrusion
26 through-hole
X profile direction
Y symmetry plane

The invention claimed is:

1. A frame structure for a child seating arrangement, comprising:
    a profiled frame element which along a profile direction of the frame element has a substantially constant cross-section, wherein the profiled frame element includes an at least predominantly closed cross-section, and wherein the profiled frame element has an inwardly projecting first protrusion which is configured to be brought into engagement with a fastening arrangement;
    wherein the profiled frame element comprises at least one through-hole that extends through the first protrusion;

wherein the profiled frame element has a second inwardly projecting protrusion;

wherein an axis of the through-hole intersects the second protrusion; and wherein a blind hole is located in the second protrusion, wherein the blind hole opens into an inner space of the profiled frame element; and wherein the profiled frame element is a one-piece body.

2. The frame structure according to claim 1, wherein the second inwardly projecting protrusion is arranged opposite the first protrusion.

3. The frame structure according to claim 2, wherein at least one of the first protrusion and the second protrusion extends over at least one of the entire profile direction, and only part of the extension of the profiled frame element in profile direction.

4. The frame structure according to claim 3, wherein the profiled frame element has a first groove extending in profile direction, which is located on the outside of the profiled frame element.

5. The frame structure according to claim 4, wherein the profiled frame element has a second groove extending in profile direction which is located on the outside of the profiled frame element and which is arranged opposite the first groove.

6. The frame structure according to claim 5, wherein at least one of the first groove and the second groove extends at least partially into at least one of the first protrusion and the second protrusion.

7. The frame structure according to claim 6, wherein at least one of the first groove and the second groove extends at least one of over and along only a part of the at least one of the first and the second protrusion extending in profile direction.

8. The frame structure according to claim 7, further comprising:

a shell element that substantially surrounds the profiled frame element, wherein the shell element is configured to be fixed to the profiled frame element such that the fastening arrangement is in engagement with the first protrusion.

9. The frame structure according to claim 8, wherein the shell element has an inwardly projecting protrusion that is configured to be brought into form-locked engagement with the groove located in the profiled frame element.

10. The frame structure according to claim 9, wherein the shell element has a through-hole for the fastening arrangement only on the side adjacent to the first protrusion.

11. The frame structure according to claim 2, wherein the first and second protrusions of the profiled frame element are arranged mirror-symmetrically to one another.

12. The frame structure according to claim 1, wherein the child seating arrangement comprises at least one of a perambulator, a child seat, and an infant carrier.

13. A perambulator that comprises the frame structure according to claim 1.

14. A child seat that comprises the frame structure according to claim 1.

15. An infant carrier that comprises the frame structure according to claim 1.

16. A shell element of the frame structure of a perambulator, child seat or infant carrier, comprising:

a sleeve;

an inwardly projecting first protrusion;

on one side surface only of the sleeve includes at least one through-hole configured as a fastening arrangement, and that extends through the first protrusion; and a second inwardly projecting protrusion;

wherein a blind hole is located in the second protrusion, and wherein the blind hole opens into an inner space of the sleeve; and wherein the profiled frame element is a one-piece body.

17. The shell element according to claim 16, wherein the two protrusions are provided on opposite inside surfaces of the shell element.

* * * * *